United States Patent
Lessiak et al.

(10) Patent No.: US 9,473,932 B2
(45) Date of Patent: Oct. 18, 2016

(54) LOCAL TRUSTED SERVICE MANAGER

(71) Applicant: NXP B.V., Eindhoven (NL)

(72) Inventors: Andreas Lessiak, Graz (AT); Dimitri Warnez, Hamburg (DE)

(73) Assignee: NXP B.V., Eindhoven (NL)

(*) Notice: Subject to any disclaimer, the term of this patent is extended or adjusted under 35 U.S.C. 154(b) by 206 days.

(21) Appl. No.: 13/962,858

(22) Filed: Aug. 8, 2013

(65) Prior Publication Data
US 2014/0047235 A1    Feb. 13, 2014

(30) Foreign Application Priority Data

Aug. 13, 2012 (EP) .................................. 12180296

(51) Int. Cl.
H04W 12/04 (2009.01)
H04W 12/00 (2009.01)
G06F 9/00 (2006.01)
G06F 21/00 (2013.01)
G06F 21/31 (2013.01)
H04W 88/06 (2009.01)

(52) U.S. Cl.
CPC ................ *H04W 12/04* (2013.01); *G06F 9/00* (2013.01); *G06F 21/00* (2013.01); *G06F 21/31* (2013.01); *H04W 12/00* (2013.01); *H04W 88/06* (2013.01)

(58) Field of Classification Search
CPC ... H04W 12/04; H04W 12/08; H04W 4/003; H04L 9/00; H04L 29/06802; H04L 63/0853; H04M 3/42153
See application file for complete search history.

(56) References Cited

U.S. PATENT DOCUMENTS 8,600,355 B1 * 12/2013 Sadhvani et al. ............. 455/411
2007/0095927 A1 5/2007 Pesonen
2012/0159148 A1 6/2012 Behren et al.

FOREIGN PATENT DOCUMENTS

CN    101026450 A    8/2007
FR    2 945 141 A1    11/2010

OTHER PUBLICATIONS

Extended European Search Report for Patent Appln. No. EP 12180296.1 (Jan. 22, 2013).
First Chinese Office Action in CN 201310287815.8 dated Nov. 6, 2015.

* cited by examiner

Primary Examiner — Eleni Shiferaw
Assistant Examiner — Paul Callahan

(57) ABSTRACT

A method for managing a secure element which is embedded into a host unit. The described method comprises (a) transmitting a request for a management script from the host unit to a program element of the secure element, (b) at the program element, generating a management script in accordance with the request and encrypting the generated management script, (c) transmitting the encrypted management script from the program element to the host unit, (d) transmitting the encrypted management script from the host unit to a secure domain of the secure element, and (e) at the secure domain, decrypting and executing the management script.

10 Claims, 3 Drawing Sheets

LOCAL TRUSTED SERVICE MANAGER

CROSS-REFERENCE TO RELATED APPLICATIONS

This application claims the priority under 35 U.S.C. §119 of European patent application no. 12180296.1, filed on Aug. 13, 2012, the contents of which are incorporated by reference herein.

FIELD OF THE INVENTION

The present invention relates to the field of GlobalPlatform compliant operating systems, such as secure elements, and in particular to a local trusted service manager application for such operating systems.

ART BACKGROUND

GlobalPlatform compliant systems, in particular secure elements, may be used to provide mobile communication units, such as mobile phones and smart phones, with a range of functions, such as performing secure credit card transactions and other communications requiring a high level of security.

A wireless service provider (also referred to as a secure element issuer) needs to be able to access the Issuer Security Domain (ISD) of the system in a number of situations, e.g. in order to perform communication, to perform setup operations, or to install, update and delete programs and functions etc. To gain access to the ISD, the issuer needs a set of keys corresponding to a set of keys stored within the system. These keys may be handled by a Trusted Service Manager (TSM). Accordingly, communication with the TSM is necessary for accessing the ISD. However, such communication requires that a connection to the TSM exists. In particular for mobile devices, this is not always the case.

US 2007/0095927 A1 describes a system and method where a mobile device manufacturer receives secure elements from a vendor and installs them in mobile devices as part of the manufacturing process. During installation of a secure element, the manufacturer securely passes an issuer-specific seed value to the secure element. Based on the seed value and a unique identifier of the secure element, the secure element generates a set of keys and stores them in its memory. With knowledge of the unique identifier, the issuer may then generate a corresponding set of keys to gain access to the secure element. However, in many cases the manufacturer will not know already at production time which issuer will actually be managing the mobile device later on, such that selection of the appropriate secure seed value will be difficult. Furthermore, a given issuer will not know the identifiers of the secure elements it will need to manage upfront, and will accordingly not be able to prepare the needed management scripts etc.

There may be a need for a simple and reliable way of obtaining access to a Global Platform compliant system, such as a secure element, without sacrificing confidentiality.

SUMMARY OF THE INVENTION

This need may be met by the subject matter according to the independent claims. Advantageous embodiments of the present invention are described by the dependent claims.

According to a first aspect there is provided a method for managing a secure element which is embedded into a host unit. The described method comprises (a) transmitting a request for a management script from the host unit to a program element of the secure element, (b) at the program element, generating a management script in accordance with the request and encrypting the generated management script, (c) transmitting the encrypted management script from the program element to the host unit, (d) transmitting the encrypted management script from the host unit to a secure domain of the secure element, and (e) at the secure domain, decrypting and executing the management script.

This aspect is based on the idea that by generating a management script by use of a program element within the secure element, encrypting the generated management script and transmitting it to the secure domain of the secure element via the host unit, it becomes possible to provide an encrypted management script to the secure domain without communicating with a separate entity, such as a TSM (Trusted Service Manager), and even though e.g. GlobalPlatform (GP) compliant secure elements do not provide the possibility of secure communication between program elements and the secure domain within a secure element. In other words, the encrypted management script is generated locally at the secure element which is embedded within the host unit (instead of being generated at an external TSM) and forwarded through the host unit to the secure domain where it is decrypted and executed in the same way as if it were actually provided by an external TSM.

In the present context, the term "secure element" may particularly denote a secure microcontroller (such as SmartMX) running on a GlobalPlatform compliant operating system, such as JCOP (Java Card Open Platform), with an NFC (Near Field Communication) front-end device. However, the term "secure element" is to be understood broadly to include any GlobalPlatform compliant operating system.

In the present context, the term "managing" may particularly indicate an operation to install, delete, modify or supervise functions and operations of a secure element or of another GlobalPlatform compliant Operating System running e.g. on a UICC (Universal Integrated Circuit Card).

In the present context, the term "program element" may particularly denote an executable program, application or applet, which is able to receive input from an associated host element, process the input and provide a corresponding output to the host element.

In the present context, the term "secure domain" may particularly denote a part of a GP compliant secure element or operating system, which provides management functions and to which access is to be kept restricted. For a GP compliant secure element, for example, the secure domain may correspond to the Issuer Security Domain (ISD) which is used by secure element issuers (i.e. mobile service providers) to manage the secure element. Alternatively, the secure domain may refer to an SSD (Supplementary Security Domain) which has fewer capabilities than an ISD.

In the present context, the term "management script" may particularly denote a series of instructions to be executed within the secure domain in order to perform a desired management operation. More specifically, the management script may consist of pre-calculated application protocol data units (APDUs) which can be used to configure the secure element.

According to an embodiment, the program element and the secure domain comprise corresponding key sets for encrypting and decrypting.

In the present context, the term "key set" may particularly denote a set of cryptographic keys, i.e. pieces of data, such as numbers, that can be used for access control, data validation, encryption/decryption of data etc.

In the present context, the term "corresponding key sets for encrypting and decrypting" indicates that the key sets are identical or can be used together, i.e. the keys in the secure domain can be used to decrypt data encrypted with the keys of the program element, and vice versa.

In an embodiment the processes referred to as encrypting and decrypting may also involve authentication processing, such as MAC (Message Authentication Code), in order to assure that the encrypted management script is not modified from the time of generation at the program element to the time where it is executed at the secure domain, i.e. on the way from the program element to the secure domain.

According to a further embodiment, the request comprises an identification of the management script.

The identification may be data, such as a string or number, which identifies a particular management script and thereby provides the program element with unambiguous information on the management script that is to be generated.

Thereby, in embodiments where the program element is capable of generating a number of different management scripts, the desired script can be selected by providing the corresponding identification as part of the request.

According to a further embodiment, the request comprises a parameter value which is to be used to generate the management script.

In the present context, the term "parameter value" may denote any data which is to be taken into account when generating the management script. Thus, the parameter value may influence or even determine one or more instructions of the generated management script. Accordingly, by transmitting a parameter value as part of the request, it is possible to influence the content of the management script.

It is explicitly noted that the request may comprise both an identification of the management script that is to be generated as well as a parameter value which is to be used when generating the management script.

According to a further embodiment, the host unit is a mobile communication unit and the parameter value is an International Mobile Equipment Identity (IMEI) of the mobile communication unit.

In the present context, the term "mobile communication unit" may denote a mobile unit capable of data communication, such as a mobile phone, a smart phone, a tablet computer, a PDA, etc.

By considering the IMEI of the mobile unit, management scripts can be generated that result in management operations that are unique for a given mobile communication unit. As an example, the IMEI may be used to generate a modified set of keys for the mobile unit.

According to a further embodiment, the management script is configured for performing a secure element management operation selected from the group consisting of a secure element lock operation, a secure element unlock operation, a secure element reset operation, a key modification operation, a program element delete operation, and a program element modify operation.

In the present context, the term "secure element lock operation" may denote an operation that results in the secure element being locked. Such an operation may e.g. be useful in cases where security has been or may have been compromised.

In the present context, the term "secure element unlock operation" may denote an operation that results in unlocking a secure element which has previously been locked, e.g. due to a security risk.

In the present context, the term "secure element reset operation" may denote an operation that results in the secure element being restored to its initial factory settings.

In the present context, the term "key modification operation" may denote an operation that results in a modified set of keys being generated and stored in the secure element. Such an operation is also often referred to as key rotation.

In the present context, the term "program element delete operation" may denote an operation that results in deletion of a program element, such as an applet, from the secure element.

In the present context, the term "program element modify operation" may denote an operation that results in modification or update of a program element within the secure element.

According to a second aspect, there is provided a management applet for locally managing a secure element which is embedded into a host unit. The described management applet comprises instructions which when executed by a secure element processor causes the secure element processor to perform the steps of (a) receiving a request for a management script from the host unit, (b) generating a management script in accordance with the received request, (c) encrypting the generated management script, and (d) transmitting the encrypted management script to the host unit.

This aspect is based on the idea that by locally, i.e. at the secure element, generating a management script, encrypting the generated management script and transmitting it to the host unit (which may then pass it on to a secure domain of the secure element), it becomes possible to provide an encrypted management script without the need of communicating with a separate entity, such as a TSM (Trusted Service Manager). In other words, the encrypted management script is generated locally without use of an external TSM but corresponds to a management script generated by such an external TSM. Thus, the management script may be forwarded to a secure domain of the secure element where it can be decrypted and executed just as if it were provided by an external TSM.

According to a further embodiment, the step of encrypting uses a set of cryptographic keys corresponding to a set of cryptographic keys which is stored in a secure domain of the secure element.

Thereby, it may be assured that the keys in the secure domain can be used to decrypt data encrypted with the keys of the management applet, and vice versa.

According to a third aspect, there is provided a secure element for a host unit. The described secure element comprises (a) a processing unit adapted to execute the management applet according to the second aspect or any of the above embodiments thereof, and (b) a secure domain adapted to receive the encrypted management script from the host unit and to decrypt and execute the management script.

Also this aspect is based on the idea that by locally, i.e. at the secure element, generating a management script, encrypting the generated management script and transmitting it to the host unit (which may then pass it on to the secure domain of the secure element), it becomes possible to provide an encrypted management script without the need of communicating with a separate entity, such as a TSM (Trusted Service Manager). In other words, the encrypted management script is generated locally without use of an external TSM but corresponds to a management script generated by such an external TSM. Thus, the management script may be forwarded to the secure domain of the secure element where it can be decrypted and executed just as if it were provided by an external TSM.

According to a fourth aspect, there is provided a mobile communications device comprising an embedded secure element according to the third aspect.

This aspect is based on the idea that by locally generating the management script in the secure element, no communication with an external TSM is necessary in order to perform management operations on the secure element. Accordingly, such management operations may be performed even when communication with an external TSM is not possible, e.g. in cases of poor network coverage or a defect within other parts of the mobile communications device.

According to a fifth aspect, there is provided a computer program comprising computer executable instructions which when executed by a computer causes the computer to perform the steps of the method according to the first aspect or any of the above embodiments.

According to a sixth aspect, there is provided a computer program product comprising a computer readable data carrier loaded with a computer program according to the fifth aspect.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is considered to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
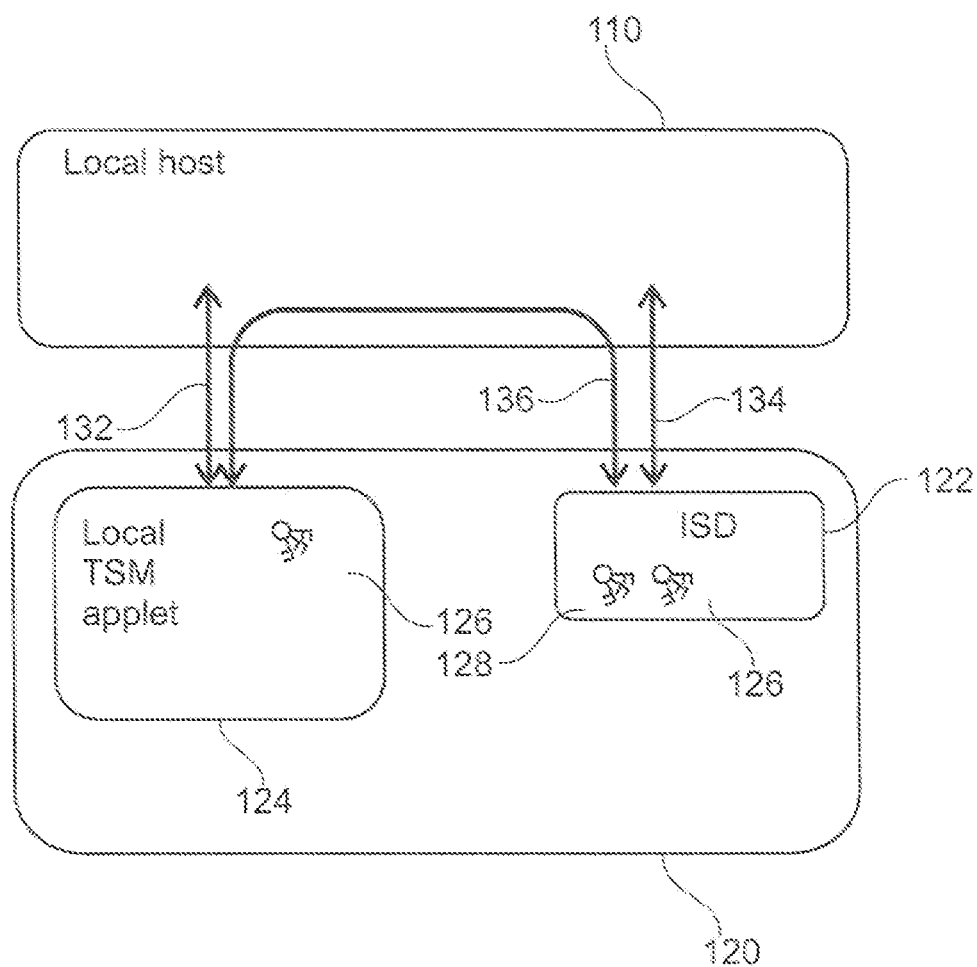
FIG. 1 shows a secure element and a local host in accordance with an embodiment.

The illustration in the drawing is schematically. It is noted that in different figures, similar or identical elements are provided with the same reference signs or with reference signs, which differ only within the first digit.

FIG. 1 shows secure element 120 and a local host 110 in communication with one another. The local host 110 may be a mobile unit, such as a mobile phone or a contactless reader. The secure element 120 comprises an Issuer Secure Domain (ISD) 122 and an applet (Local TSM) 124. The ISD 122 is part of the operating system (running on JCOP=Java Card Open Platform) of a microcontroller (not shown) of the secure element 120 and comprises two sets of cryptographic keys 126, 128. The set of cryptographic keys 128 may be shared with an external Trusted Service Manager (not shown) while the set of cryptographic keys 126 is shared with the applet 124 such that the ISD 122 is capable of decrypting data encrypted by the applet 124 and vice versa.

In operation, the local host 110 transmits a request for a management script to the applet 124 via connection 132. In response to the request, the applet 124 generates a corresponding APDU script, encrypts it using keys 126 and transmits the encrypted script back to the local host 110 via connection 132. Then, the local host 110 transmits the encrypted script to the ISD 122 of the secure element 120 via connection 134. Thereby, as indicated by arrow 136, a secure communication channel running from the applet 124 through the host unit 110 to the ISD 122 is established. Upon receiving the encrypted script, the ISD decrypts it using the keys 126, and finally executes the decrypted script resulting in that a desired management operation, such as rotation of the ISD keys 126, 128, lock, unlock or reset of the secure element 120, or deletion or modification of the applet 124 or other applets from the secure element 120.

Figure 2:
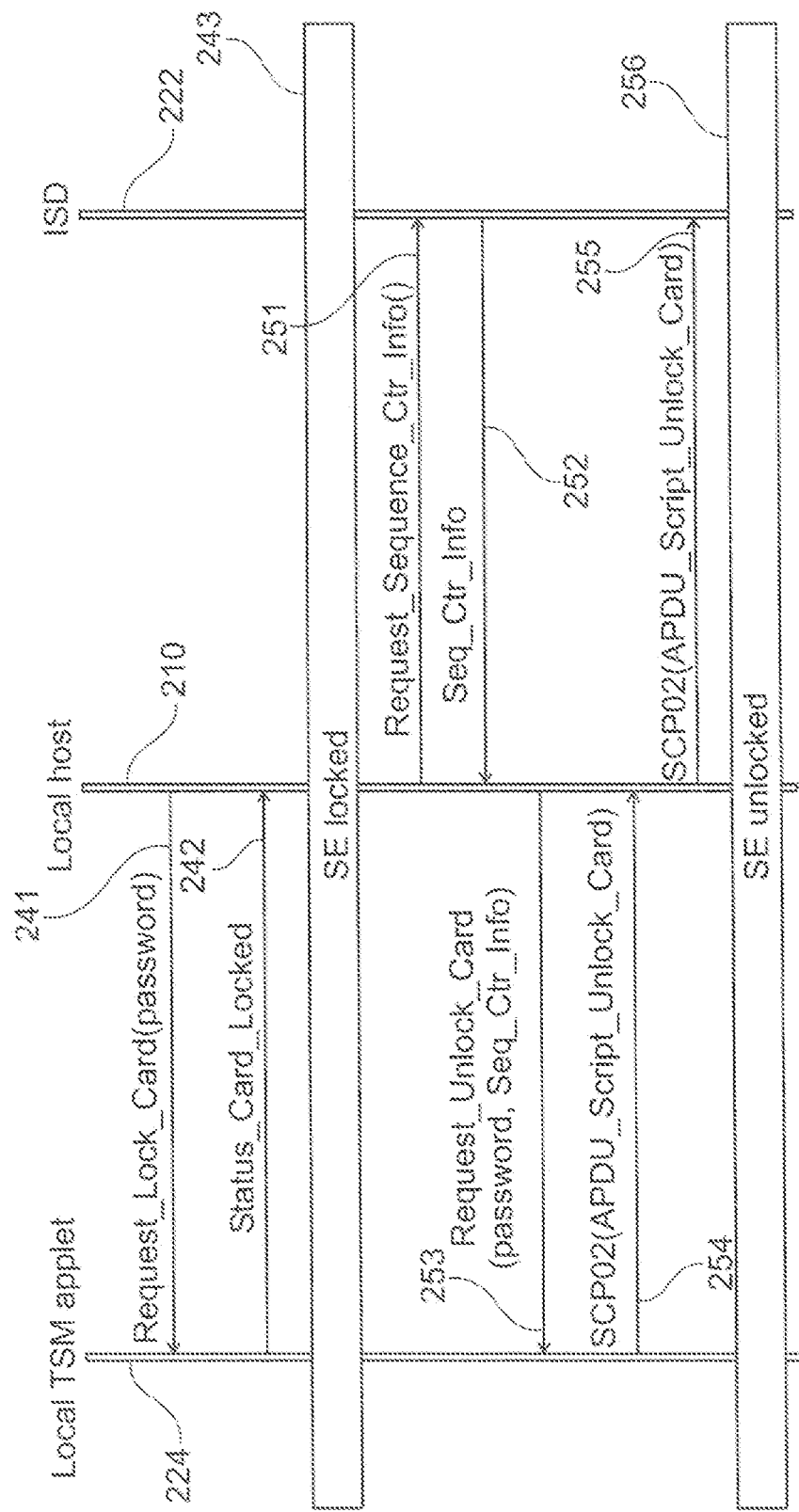
FIG. 2 shows an overview of a lock/unlock operation performed by a secure element in accordance with an embodiment.

FIG. 2 shows an overview of a lock/unlock operation of a secure element corresponding to secure element 110 described above.

To lock the secure element, a corresponding request is transmitted together with a password from the local host 210 to the applet 224 as indicated by arrow 241. If the password is accepted by the applet 224, the secure element is locked and a corresponding message is returned to the local host as indicated by arrow 242. The secure element stays in the locked state 243 until an unlock operation is performed. The unlock operation is initiated by transmitting a request for sequence counter information from the local host 210 to the ISD 222 as indicated by arrow 251. The requested information is returned by the ISD 222 to the local host 210 as indicated by arrow 252 and then the local host 210 transmits a request for generation of an APDU unlock script to the applet 224 as indicated by arrow 253. The request is accompanied by the sequence counter information and a password and if the information and password are accepted by the applet 224, the requested script is generated, encrypted and MACed, and transmitted from the applet 224 to the local host 210 as indicated by arrow 254. Finally, the encrypted script is passed on to the ISD 222 as indicated by arrow 255. After decrypting and executing the script at ISD 222, the secure element is in the unlocked state 256.

Figure 3:
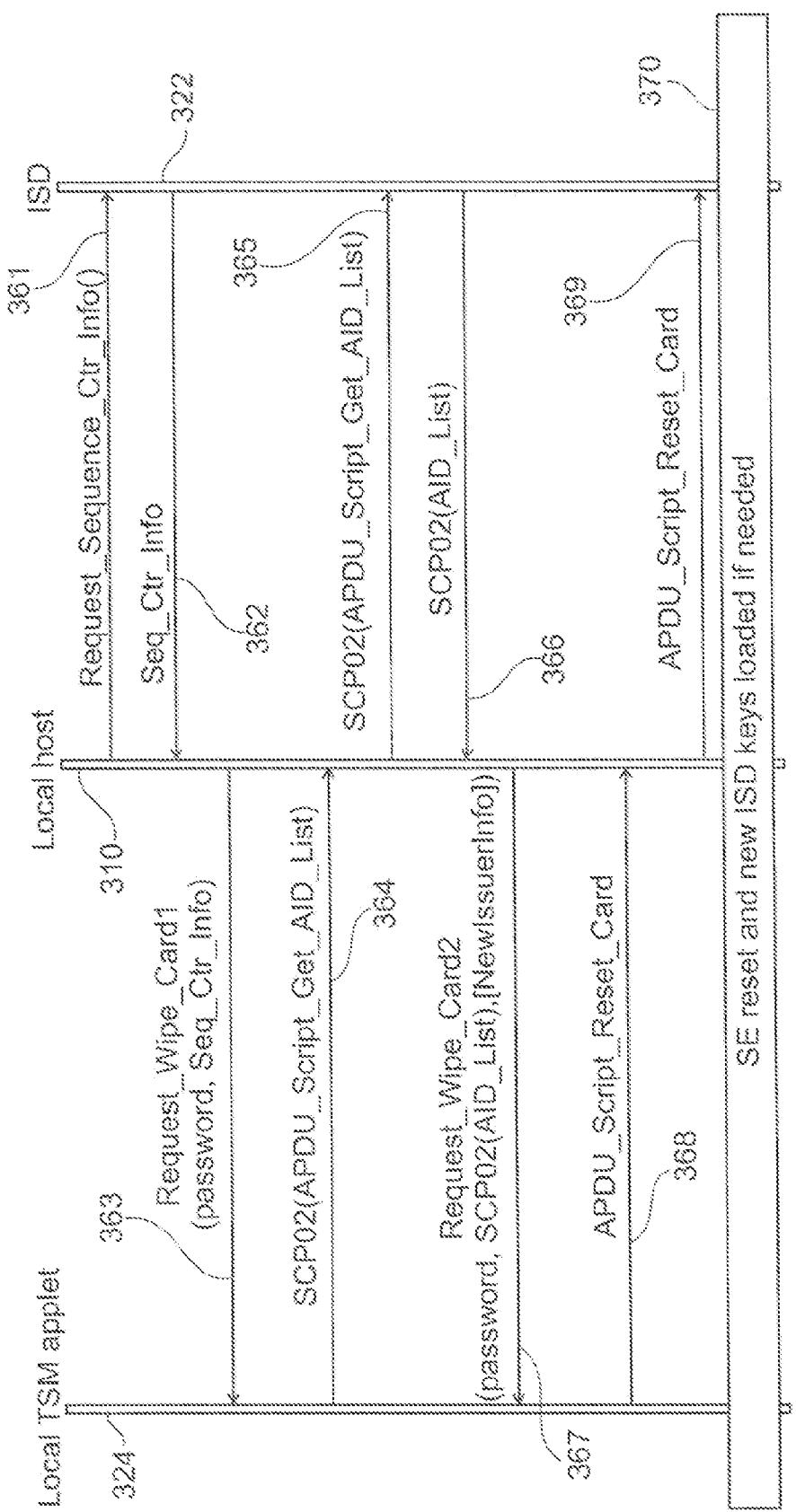
FIG. 3 shows an overview of a reset operation performed by a secure element in accordance with an embodiment.

FIG. 3 shows an overview of a reset operation of a secure element corresponding to secure element 110 described above.

The reset operation is initiated by transmitting a request for sequence counter information from the local host 310 to the ISD 322 as indicated by arrow 361. The requested information is returned by the ISD 322 to the local host 310 as indicated by arrow 362 and then the local host 310 transmits a request for generation of a first APDU reset script to the applet 324 as indicated by arrow 363. The request is accompanied by the sequence counter information and a password and if the information and password are accepted by the applet 324, the requested first script is generated, encrypted and MACed, and transmitted from the applet 324 to the local host 310 as indicated by arrow 364 and further from the local host 310 to the ISD 322 as indicated by arrow 365. The first script is decrypted and executed at ISD 322, which results in transmission of a preferably encrypted list of application identifiers from the ISD 322 to the local host 310 as indicated by arrow 366. Then a request for generation of a second APDU reset script is, as indicated by arrow 367, transmitted from the local host 310 to the applet 324 together with the password, list of application identifiers and, optionally, information on a new Issuer taking over operation of the secure element. The requested second APDU reset script is generated and transmitted from the applet 324 to the local host 310 as indicated by arrow 368 and on to the ISD as indicated by arrow 369. Upon execution of the second script, the secure element is reset in accordance with the list of application identifiers. Further, if taken over by a new Issuer, corresponding new keys are generated and loaded as indicated at 370.

It is explicitly noted that the reference to specific functions, operations and protocols in connection with the embodiments shown in FIGS. 2 and 3 are only examples. For example, the reference to "SCP02( . . . )" does not exclude the use of other GlobalPlatform compliant protocols relating to Secure Channels.

It is noted that, unless otherwise indicated, the use of terms such as "upper", "lower", "left", and "right" refers solely to the orientation of the corresponding drawing.

It should be noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. A method for managing a secure element which is embedded into a host unit, the method comprising:
    transmitting a request for a management script from the host unit to a program element of the secure element;
    at the program element, generating a management script in accordance with the request and encrypting the generated management script;
    transmitting the encrypted management script from the program element to the host unit;
    transmitting the encrypted management script from the host unit to a secure domain of the secure element; and
    at the secure domain, decrypting and executing the management script, wherein the request comprises a parameter value which is to be used to generate the management script, the host unit is a mobile communication unit, and the parameter value is an International Mobile Equipment Identity of the mobile communication unit.

2. The method according to claim 1, wherein the program element and the secure domain comprise corresponding key sets for encrypting and decrypting.

3. The method according to claim 1, wherein the request comprises an identification of the management script.

4. The method according to claim 1, wherein the management script is configured to perform a secure element management operation selected from a group consisting of a secure element lock operation, a secure element unlock operation, a secure element reset operation, a key modification operation, a program element delete operation, and a program element modification operation.

5. A secure element for a host unit, the secure element comprising:
    a management applet configured to locally manage the secure element which is embedded into the host unit, the management applet comprising instructions which, when executed by a secure element processor, cause the secure element processor to receive a request for a management script from the host unit, generate a management script in accordance with the received request, encrypt the generated management script, and transmit the encrypted management script to the host unit;
    a processing unit configured to execute the management applet; and
    a secure domain configured to receive the encrypted management script from the host unit and to decrypt and execute the management script, wherein the received request comprises a parameter value used to generate the management script, the host unit is a mobile communication unit, and the parameter value is an International Mobile Equipment Identity of the mobile communication unit.

6. A mobile communications device comprising the embedded secure element according to claim 5.

7. The secure element according to claim 5, wherein the step of encrypting uses a set of cryptographic keys corresponding to a set of cryptographic keys which is stored in a secure domain of the secure element.

8. The secure element of claim 5, wherein the request further comprises an identification of the management script.

9. A non-transitory computer-readable medium comprising instructions which, when executed by a computer, cause the computer to perform a method for managing a secure element, the non-transitory computer-readable medium comprising:
    instructions for transmitting a request for a management script from the host unit to a program element of the secure element;
    instructions for, at the program element, generating a management script in accordance with the request and encrypting the generated management script;
    instructions for transmitting the encrypted management script from the program element to the host unit;
    instructions for transmitting the encrypted management script from the host unit to a secure domain of the secure element; and
    instructions for, at the secure domain, decrypting and executing the management script, wherein the request comprises a parameter value which is to be used to generate the management script, the host unit is a mobile communication unit, and the parameter value is an International Mobile Equipment Identity of the mobile communication unit.

10. The non-transitory computer-readable medium of claim 9, wherein the request further comprises an identification of the management script.

* * * * *